United States Patent
Thomas

(10) Patent No.: US 6,814,201 B2
(45) Date of Patent: Nov. 9, 2004

(54) BI-DIRECTIONAL AXIALLY APPLIED PAWL CLUTCH ASSEMBLY

(75) Inventor: Matthew Thomas, Inkster, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 10/366,501

(22) Filed: Feb. 13, 2003

(65) Prior Publication Data

US 2004/0159517 A1 Aug. 19, 2004

(51) Int. Cl.[7] .............................................. F16D 41/12
(52) U.S. Cl. ........................ 192/43.1; 192/46; 192/47; 192/48.92; 192/69.1
(58) Field of Search ............................. 192/43.1, 45.1, 192/46, 47, 48.2, 48.8, 48.9, 48.91, 48.92, 69.1, 90, 91 A, 87.11, 87.17; 74/665 K

(56) References Cited

U.S. PATENT DOCUMENTS

| | | |
|---|---|---|
| 1,831,955 A | 11/1931 | Harney |
| 2,173,044 A | 9/1939 | Ruggles et al. |
| 2,290,089 A | 7/1942 | Bock |
| 2,443,597 A * | 6/1948 | Carnagua et al. ........ 192/48.91 |
| 2,551,939 A | 5/1951 | Gerst |
| 2,887,201 A | 5/1959 | Willis |
| 2,906,383 A | 9/1959 | Gabriel |
| 2,969,134 A | 1/1961 | Wiedmann et al. |
| 3,481,436 A | 12/1969 | Wilkowski |
| 3,517,573 A | 6/1970 | Roper |
| 3,631,741 A | 1/1972 | Kelbel |
| 4,114,478 A | 9/1978 | Clauss |
| 4,373,407 A * | 2/1983 | Okubo ..................... 192/48.92 |
| 4,407,387 A | 10/1983 | Lindbert |
| 5,152,726 A | 10/1992 | Lederman |
| 5,355,981 A | 10/1994 | Itoh et al. |
| 5,466,195 A | 11/1995 | Nogle et al. |
| 5,584,776 A | 12/1996 | Weilant et al. |
| 5,605,211 A * | 2/1997 | Hall, III .................... 192/69.1 |
| 5,653,322 A | 8/1997 | Vasa et al. |
| 5,704,867 A | 1/1998 | Bowen |
| 5,806,643 A | 9/1998 | Fitz |
| 5,918,715 A | 7/1999 | Ruth et al. |
| 5,927,455 A * | 7/1999 | Baker et al. ............... 192/43.1 |
| 6,076,643 A * | 6/2000 | Brockschmidt .......... 192/48.91 |
| 6,116,024 A | 9/2000 | Rottino |
| 6,149,543 A | 11/2000 | Breen |
| 6,186,299 B1 | 2/2001 | Ruth |
| 6,244,965 B1 * | 6/2001 | Klecker et al. ............ 192/43.1 |
| 6,290,044 B1 * | 9/2001 | Burgman et al. ............. 192/46 |
| 6,386,349 B1 * | 5/2002 | Welch ....................... 192/43.1 |

* cited by examiner

Primary Examiner—Rodney H. Bonck
(74) Attorney, Agent, or Firm—Bliss McGlynn, P.C.; Greg Dziegielewski

(57) ABSTRACT

A bi-directional overrunning clutch assembly (10, 110, 210) including a drive member (12, 112, 212) that is rotatable about an axis (A) and a pair of driven members (14, 16; 114, 116; 214, 216) that are similarly rotatable about the axis of rotation. and are disposed on either side of the drive member (12, 112, 212). A first engagement mechanism (26, 126, 226) is supported between the confronting surfaces of the drive member (12, 112, 212) and one of the driven members (14, 114, 214). A second engagement mechanism (28, 128, 228) is supported between the confronting surfaces of the drive member (12, 112, 212) and the other driven member (16, 116, 216). A pair of actuators (32, 34; 132, 134; 232; 234) are associated with the first and second engagement mechanisms (26, 28; 126, 128; 226, 228). Each actuator is operable to move its associated engagement mechanism in an axial direction between the disengaged and engaged positions.

7 Claims, 6 Drawing Sheets

BI-DIRECTIONAL AXIALLY APPLIED PAWL CLUTCH ASSEMBLY

BACKGROUND OF THE INVENTION

1. Field of the Invention

The present invention relates, generally, to clutch assemblies and more specifically, to a bi-directional, axially applied pawl clutch assembly.

2. Description of the Related Art

Generally speaking, land vehicles require three basic components. These components include a power plant (such as an internal combustion engine), a power train and wheels. The power train's main component is typically referred to as the "transmission." Engine torque and speed are converted in the transmission in accordance with the tractive-power demand of the vehicle. One-way clutches are frequently employed in transmissions, transfer cases, torque converters, and differentials to selectively transmit torque in one rotational direction, but not in the opposite rotational direction. To this end, one-way clutches typically include an inner race, an outer race, and an engagement mechanism disposed therebetween. The engagement mechanism is operable to lock the inner and outer races together thereby transmitting torque in one relative direction. The engagement mechanism is further operable to allow freewheeling rotation between the inner and outer races in the opposite rotational direction.

Engagement mechanisms commonly used in one-way clutches of the related art include pawls, sprags, and rollers. A cage, along with biasing members, such as springs, are also sometimes employed to retain the pawls, sprags, or rollers between the inner and outer races as well as to selectively assist in the change of operational modes between torque translation and freewheeling actuation of the clutch, depending on the direction of rotation between the inner and outer races. Where the engagement mechanism is a pawl, the pawls are often carried in pockets formed on the inner diameter of the outer race and are biased toward the rotational axis of the clutch assembly and into engagement with teeth formed on the outer diameter of the inner race. Alternatively, it is known in the related art to employ pawls that are moveable in the general direction of the axis of rotation of the clutch assembly between a drive and driven member of a one-way clutch to translate torque therebetween.

In addition to one-way clutches, bi-directional overrunning clutches have also been proposed in the related art. These bi-directional overrunning clutch assemblies typically employ an inner race, an outer race, and a plurality of rollers as the engagement mechanism disposed therebetween. The bi-directional overrunning clutches generally known in the related art are typically designed to be self-actuating. However, these self-actuating bi-directional overrunning clutches are relatively mechanically complex and have certain physical limitations and drawbacks. For example, the inner and outer race must rotate relative to one another over a relatively large angular distance between an engaged position in one rotational direction and the engaged position in the opposite rotational direction. Unfortunately, this relatively large angular movement between the inner and outer races causes relatively hard lock-ups during transitions where the direction of torque translation is reversed and thus produces undesirable driving conditions. In addition, the relatively abrupt, hard lock-ups also tend to shorten the useful mechanical life of the clutch assembly due to the severe impact forces that are generated between transitional engagements. Moreover, the self-actuating bi-directional clutches known in the related art generally suffer from the disadvantage that they cannot be selectively engaged in an efficient manner or to optimize the vehicle power output in response to varying driving conditions. For these reasons, the bi-directional overrunning clutch assemblies known in the related art have not been widely employed in transmissions, transfer cases, and differentials.

Accordingly, there remains a need in the art for a bi-directional clutch that can be selectively actuated and controlled in a manner to provide driving comfort and offer efficient operating modes for various driving conditions. Furthermore, there remains a need in the art for a controllable bi-directional overrunning clutch assembly that can provide both torque translation and freewheeling operation in either rotational direction. In addition, there remains a need in the art for a bi-directional clutch assembly that can be effectively shifted between various operational modes without jamming of the engagement mechanism or other failures occurring at the interface between the races of the clutch assembly.

SUMMARY OF THE INVENTION

The present invention overcomes the disadvantages of the related art in a bi-directional overrunning clutch assembly including a drive member that is rotatable about an axis and a pair of driven members that is similarly rotatable about the axis of rotation. The pair of driven members are disposed on either side of the drive member such that each one of the pair of driven members is in side-by-side confronting relationship with the drive member. In addition, the clutch assembly includes first and second engagement mechanisms. The first engagement mechanism is supported between the confronting surfaces of the drive member and one of the driven members. The second engagement mechanism is supported between the confronting surfaces of the drive member and the other driven member. The first engagement mechanism is operable to be deployed between a disengaged position allowing relative rotation between the drive member and the driven member associated with the first engagement mechanism and an engaged position where the first engagement mechanism acts to translate torque between the drive member and the associated driven member in one rotational direction. On the other hand, the second engagement mechanism is operable to be deployed between a disengaged position allowing relative rotation between the drive member and the driven member associated with the second engagement mechanism and an engaged position where the second engagement mechanism acts to translate torque between the drive member and the associated driven member in the opposite rotational direction translated with respect to the first engagement mechanism. Furthermore, the bi-directional overrunning clutch assembly of the present invention includes a pair of actuators that are associated with the first and second engagement mechanisms. Each actuator is operable to move its associated engagement mechanism in an axial direction between the disengaged and engaged positions.

In this way, the present invention provides a bi-directional clutch that can be selectively actuated and controlled in a manner to provide driving comfort and offer efficient operational modes for various driving conditions. Furthermore, the bi-directional overrunning clutch assembly of the present invention is controllable such that it can provide both torque translation and freewheeling operation in either rotational direction. In addition, the bi-directional overrunning clutch assembly of the present invention can be effectively shifted between various operational modes without jamming of the engagement mechanisms or other failures occurring at the interface between the drive member and the two driven members associated with the drive member. Finally, the bi-directional overrunning clutch assembly of the present invention is mechanically simple, cost effective to manufacture, and overcomes the deficiencies in the related art in an efficient manner.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

A clutch assembly of the present invention is generally indicated at 10, 110 and 210 in FIGS. 1–11, where like numerals are used to designate like structure throughout the drawings. In the preferred embodiment illustrated in these figures, the clutch assembly is bi-directional and overrunning and has four operational modes. These four modes are illustrated with reference to the cross-sectional views of FIGS. 1 and 3–11. The clutch assembly 10, 110 and 210 is particularly adapted for use as a component of drivelines of land-based vehicles, such as transmissions, transfer cases, torque converters, differentials and the like. However, those having ordinary skill in the art will appreciate that the clutch assembly of the present invention may be employed in numerous applications, whether or not the application requires bi-directional functionality or takes advantage of all four operational modes of the clutch assembly as discussed below.

Figure 1:
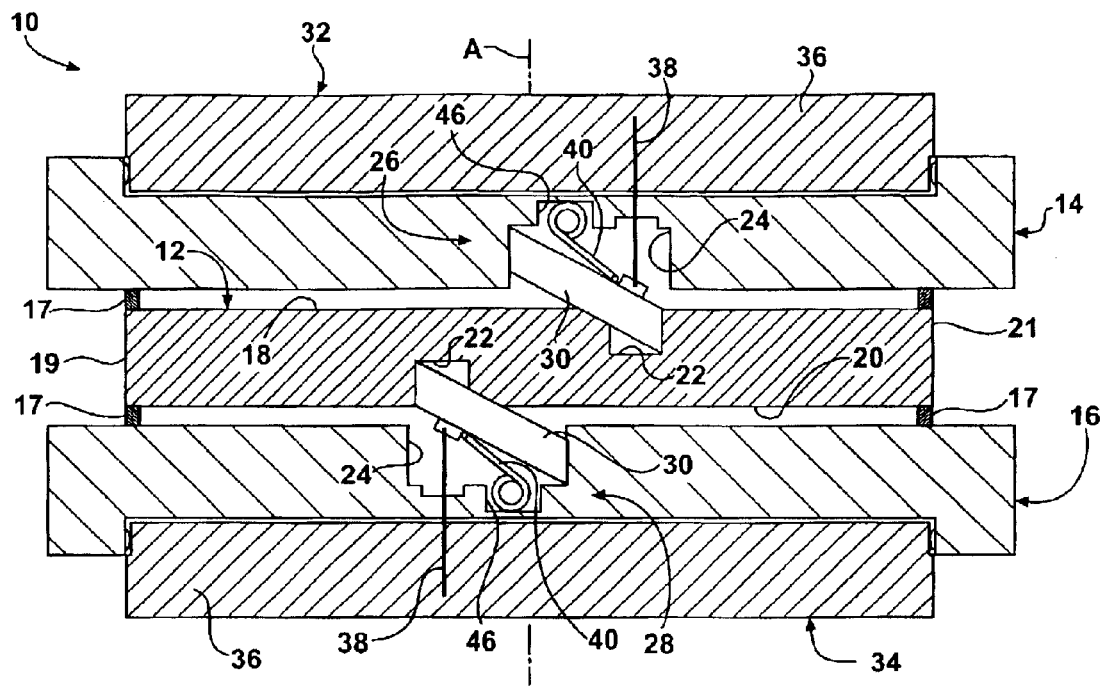
FIG. 1 is a cross-sectional top view of one embodiment of the bi-directional overrunning clutch assembly of the present invention illustrating the first and second engagement mechanism in their engaged position.
Figure 2:
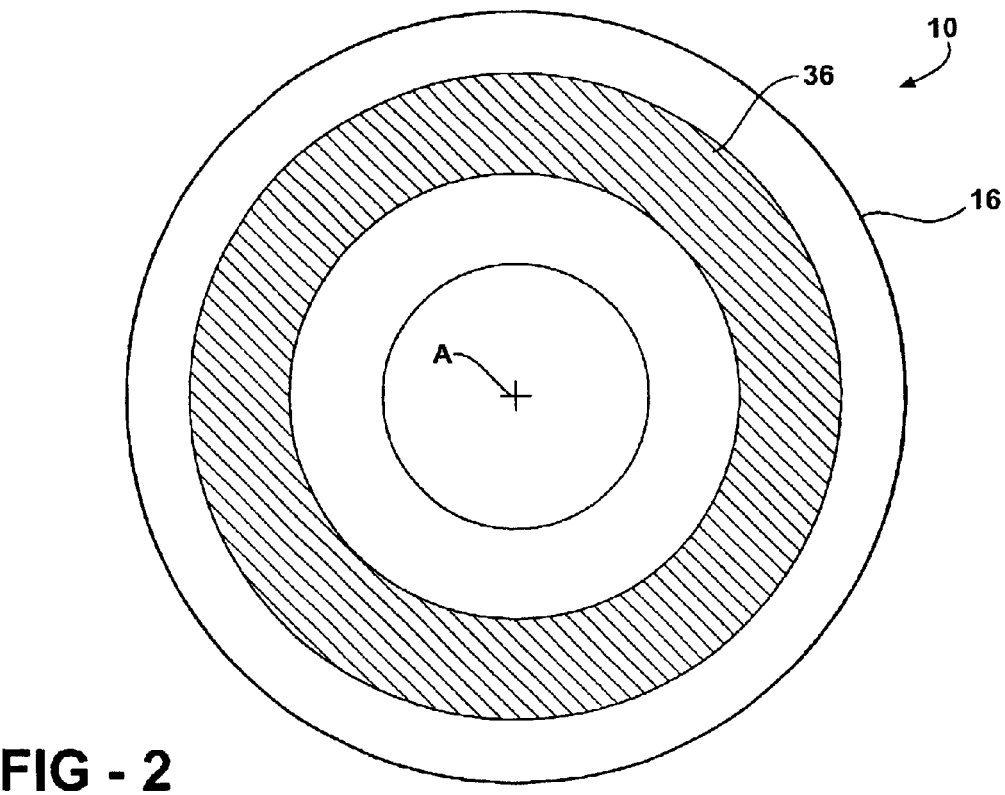
FIG. 2 is a side view of the bi-directional overrunning clutch assembly of the present invention.

Referring now specifically to FIGS. 1–2, the clutch assembly 10 of the present invention includes a drive member, generally indicated at 12, that is rotatable about an axis A, and a pair of driven members, generally indicated at 14, 16, that are similarly rotatable about the axis A. The driven members 14, 16 are disposed on either side of the drive member 12 such that each one of the pair of driven members 14, 16 is in side-by-side confronting relationship with the drive member 12. More specifically, the drive member 12 includes a pair of generally planer surfaces 18, 20 that are spaced from one another and disposed on opposite sides of the drive member 12. Each of the planer surfaces 18, 20 includes a plurality of recesses 22 that are formed therein and spaced relative to one another about the rotational axis A of the drive member 12. On the other hand, each of the pair of driven members 14, 16 includes a plurality of pockets 24 that are formed therein on the surface confronting the associated surfaces 18, 20 of the drive member 12. The driven members 14, 16 are operatively connected for rotation together by end portions 17 that extend between the driven members 14, 16 at either end 19, 21 of the drive member 12.

The bi-directional overrunning clutch assembly 10 also includes first and second engagement mechanisms 26, 28. The first engagement mechanism 26 is supported between the confronting surface 18 of the drive member 12 and one of the driven members 14. The second engagement mechanism 28 is supported between the confronting surface 20 of the drive member 12 and the other one of the driven members 16. The first engagement mechanism 26 is operable to be deployed between a disengaged position (FIG. 4) that allows relative rotation between the drive member 12 and the driven member 14 associated with the first engagement mechanism 26. Furthermore, the first engagement mechanism 26 is operable to be deployed in an engaged position (FIG. 3) wherein the first engagement mechanism 26 acts to translate torque between the drive member 12 and the associated driven member 14 in one rotational direction.

Similarly, the second engagement mechanism 28 is operable to be deployed between a disengaged position (FIG. 3) that allows relative rotation between the drive member 12 and the driven member 16 associated with the second engagement mechanism 28. The second engagement mechanism 28 is also operable to be deployed in an engaged position (FIG. 4) wherein the second engagement mechanism 28 acts to translate torque between the drive member 12 and the associated driven member 16 in the opposite rotational direction translated with respect to the first engagement mechanisms 26.

Both the first and second engagement mechanisms 26, 28 may also be disposed in their engaged position as shown in FIG. 1. In this operative mode, torque is translated in both rotational directions between the drive member 12 and the pair of driven members 14, 16. On the other hand and with reference to FIG. 5, both the first and second engagement mechanisms 26, 28 may be disposed in their disengaged position. In this operative mode, no torque is translated in either rotational direction.

To this end, each of the first and second engagement mechanisms 26, 28 include a plurality of pawls 30 that are associated with the pockets 24 formed on each of the driven members 14, 16. Each pawl 30 is operable to move in an axial direction between the disengaged position and its engaged position and into torque translating disposition with respect to the associated recess 22 defined on the confronting surfaces 18, 20 of the drive members 12. More specifically, movement of the pawls 30 between their disengaged and engaged positions is generally in the direction of the rotational axis A of the clutch assembly 10 as opposed to in a direction toward the rotational axis as is in the case where the pawl is supported on the inner diameter of the outer race of clutch assemblies known in the related art.

The bi-directional overrunning clutch assembly 10 also includes a pair of actuators, generally indicated at 32 and 34, that are associated with the first and second engagement mechanisms 26, 28, respectively. Each actuator 32, 34 is operable to move the associated engagement mechanism 26, 28 in an axial direction between its disengaged and engaged position. More specifically, and in the embodiment illustrated in FIGS. 1–5, the pair of actuators 32, 34 includes a plate 36 and a plurality of wires 38 associated with each one of the plurality of pawls 30. The wires 38 interconnect the pawls 30 and each plate 36 associated with a particular actuator 32 or 34. Each plate 36 is selectively rotatable to move the pawls 30 through the wire connections 38 between the engaged position and the disengaged position. In addition, each of the pair of actuators 32, 34 includes a plurality of biasing members 40 that are associated with each one of the plurality of pawls. The biasing members are carried in a cavity 46 defined at the back of each pocket 24 formed on the driven members 14, 16. The biasing members 40 act to bias the pawls 30 in an axial direction toward its associated recess 22 defined on the confronting surface 18, 20 of the drive members 12. Thus, rotation of each plate 36 in one direction generates a force on the pawl in a direction opposite to the force generated by the biasing member 40 to move the pawl 30 to its disengaged position. Rotation of the plate 36 in the opposite direction relaxes the force acting on the pawl through the wire connection 38 such that the biasing force generated by the biasing member 40 moves the pawl 30 in an axial direction toward the drive member 12 and into the associated recess 22 defined on the confronting surfaces 18, 20 to provide torque translation therebetween.

Figure 5:
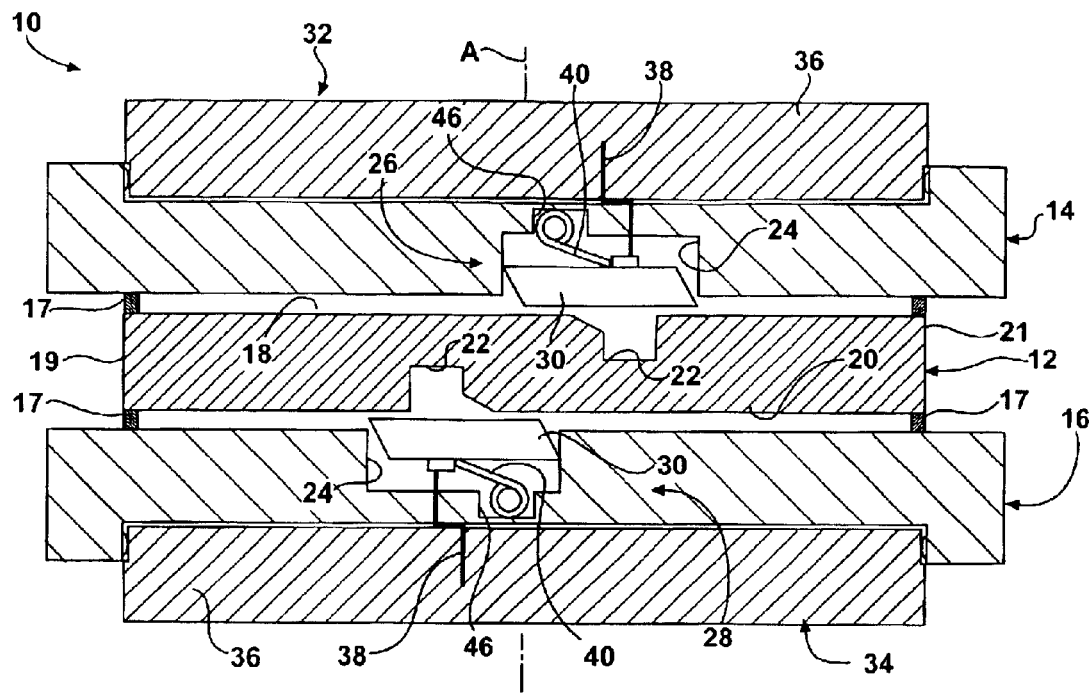
FIG. 5 is a cross-sectional top view of the bi-directional overrunning clutch assembly shown in FIG. 1 illustrating the first and second engagement mechanisms in their disengaged position.
Figure 6:
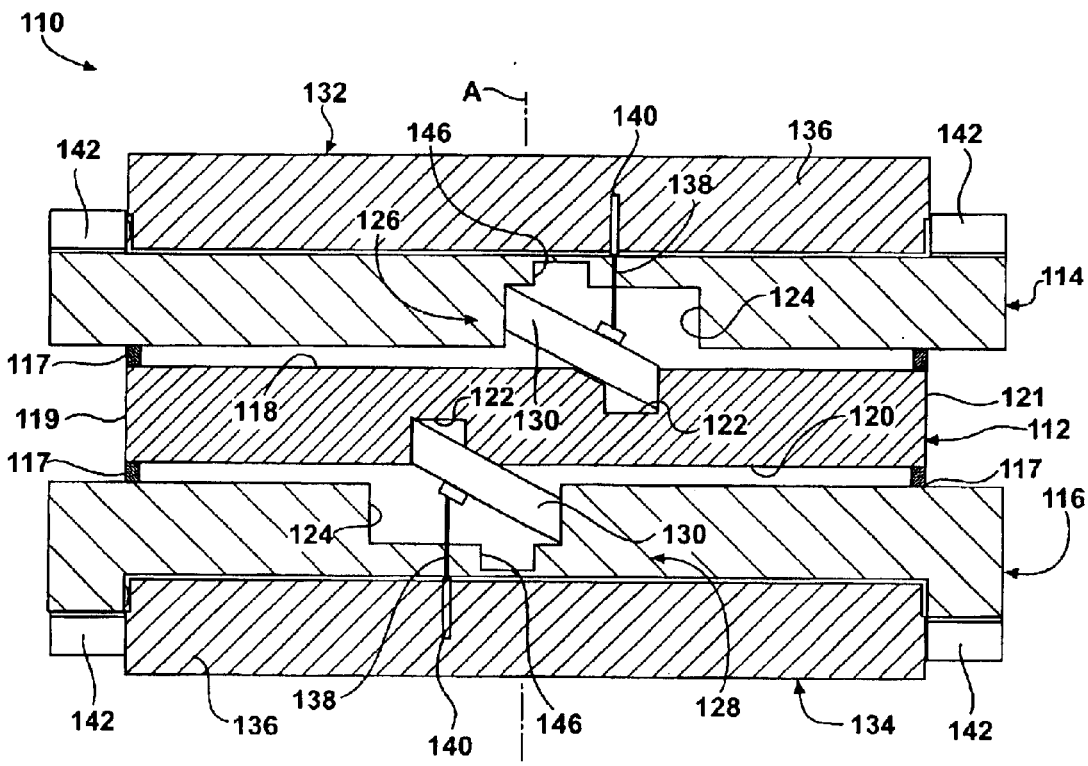
FIG. 6 is a cross-sectional top view of another embodiment the bi-directional overrunning clutch assembly of the present invention illustrating the first and second engagement mechanisms in their engaged positions.
Figure 7:
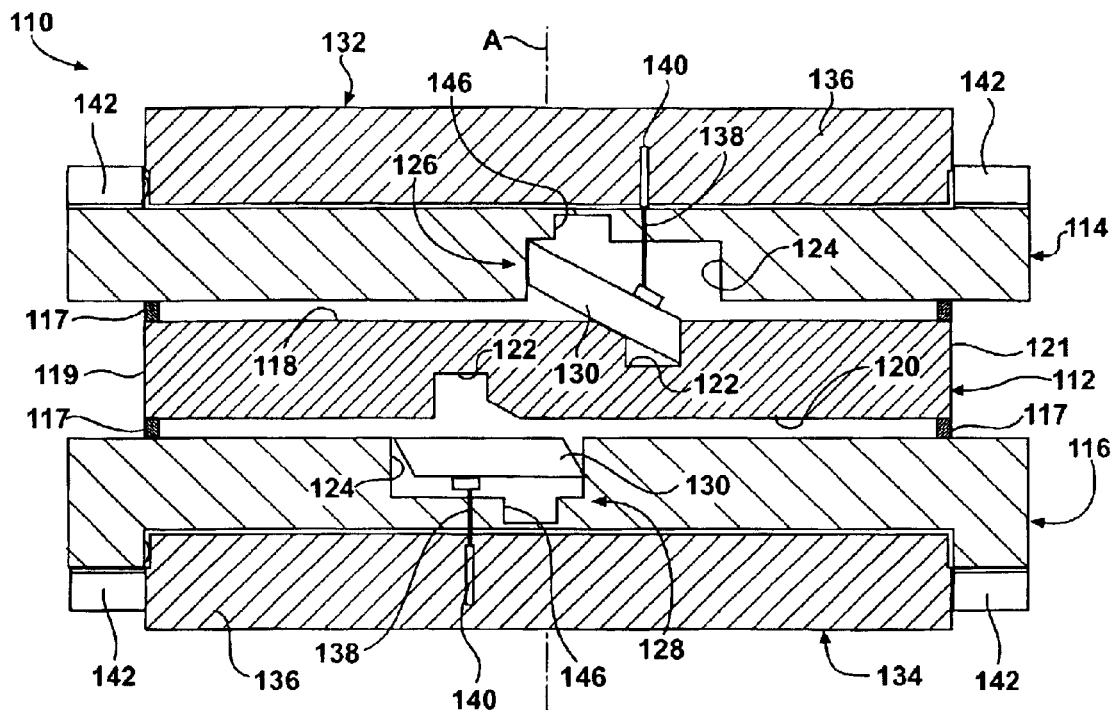
FIG. 7 is a cross-sectional top view of the bi-directional overrunning clutch assembly shown in FIG. 6 illustrating the first engagement mechanisms in its engaged position and the second engagement mechanism in its disengaged position.
Figure 8:
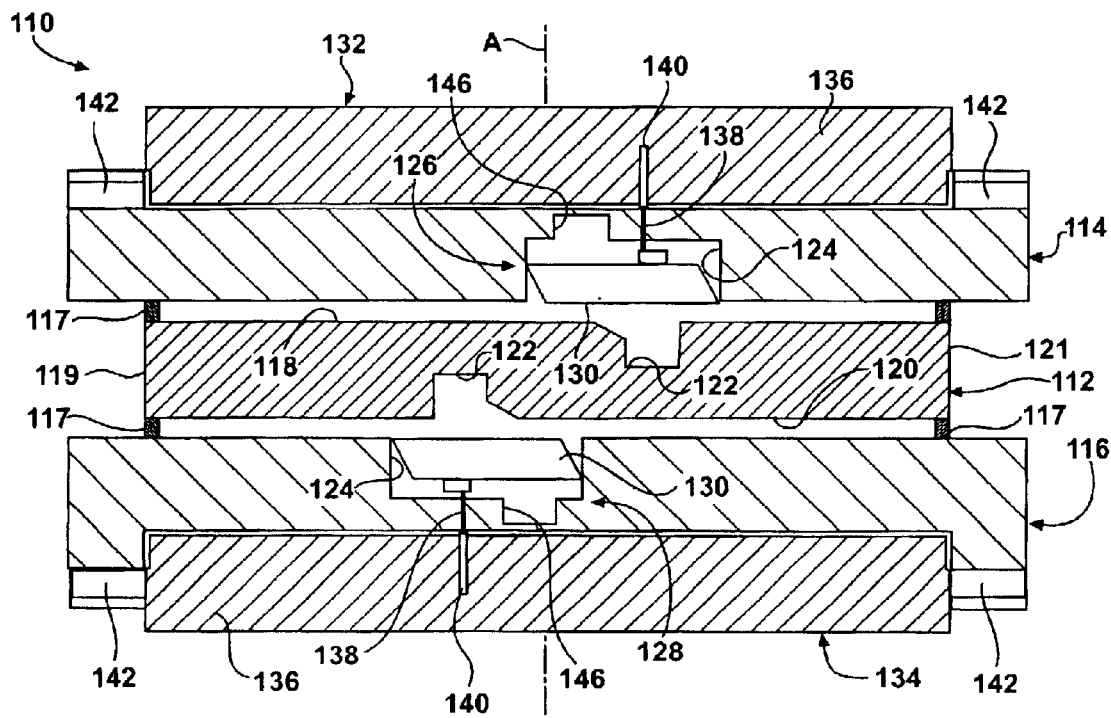
FIG. 8 is a cross-sectional top view of the bi-directional overrunning clutch assembly shown in FIG. 6 illustrating the first and second engagement mechanisms in their disengaged positions.

Referring now to FIGS. 6–8 where like numerals increased by 100 are used to designate like structure, an alternate embodiment of the bi-directional overrunning clutch assembly of the present invention is generally indicated at 110. In this embodiment, the drive member 112, driven members 114, 116, and the first and second engagement mechanisms 126, 128 includes substantially the same structure as that described with respect to the embodiment illustrated in FIGS. 1–5. Furthermore, the bi-directional overrunning clutch assembly 110 differs from the embodiment illustrated in FIGS. 1–5 only in connection with the structure of the pair of actuators 132, 134. Accordingly, the description that follows will focus primarily on these structural differences. Those having ordinary skill in the art will appreciate that, to the extent that any specific structure of the clutch assembly illustrated in FIGS. 6–8 is not specifically discussed below, its structure and function is the same as for that described with respect to the clutch assembly 10 illustrated in FIGS. 1–5.

In the embodiment illustrated in FIGS. 6–8, the pair of actuators 132, 134 includes a plate 136 and a plurality of spring-loaded pins 138 that are associated with each one of the plurality of pawls 130. The spring-loaded pins 138 extend between and interconnect the plates 136 and each one of the pawls 130. The plate 136 is selectively moveable in an axial direction to move the pawls 130 through the spring-loaded pins 138 between their engaged and disengaged positions. To this end, at least one chamber 142 is defined between each plate 136 and its associated driven member 114, 116. Each chamber 142 is in fluid communication with a source of hydraulic pressure. The hydraulic pressure acts on the plate 136 through the chamber 142 to move the plate in a direction parallel to the rotational axis A of the clutch assembly 110 and away from the driven member 112. When the plate 136 is moved away from the driven member 112, it selectively moves the spring-loaded pins 138 which in turn, move the associated pawls 130 to their disengaged positions. On the other hand, each of the pair of actuators 132, 134 include a biasing member 140 that produces a biasing force on the plate 136 in a direction opposite of the force of the hydraulic pressure acting on the plate 136 through the chamber 142. In this way, the plate 136 may be moved toward the drive member 112 thereby moving the associated pawls 130 to their engaged position and in torque translating relationship with an associated recess 122.

Figure 9:
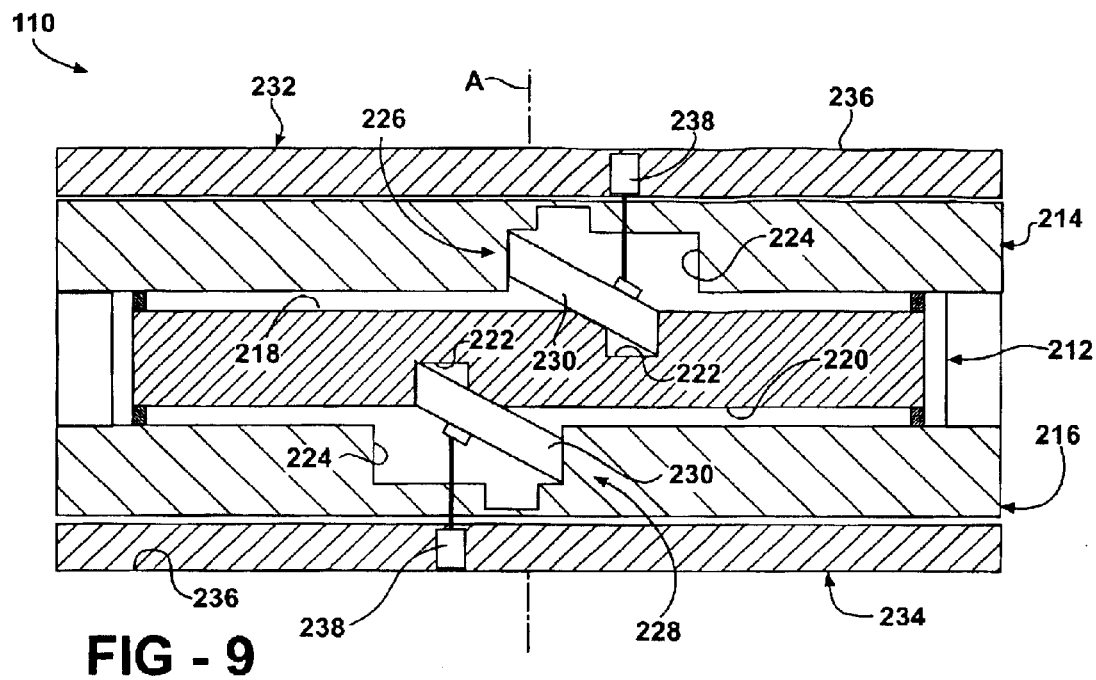
FIG. 9 is a cross-sectional top view of another embodiment of the bi-directional overrunning clutch assembly of the present invention illustrating the first and second engagement mechanisms in their engaged positions.
Figure 10:
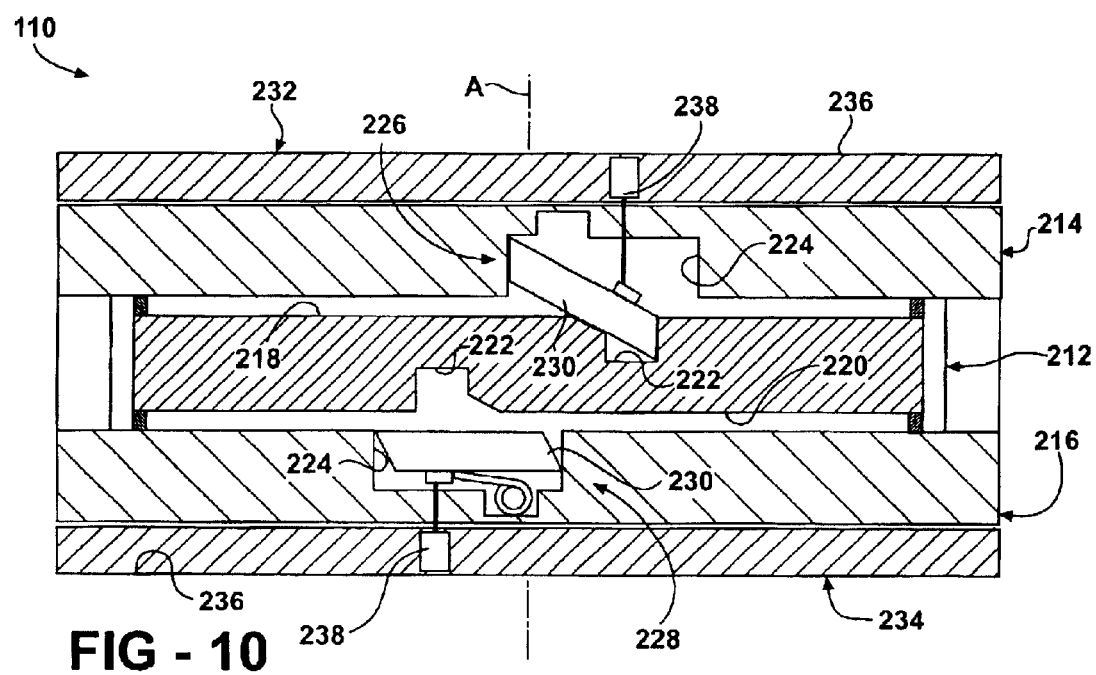
FIG. 10 is a cross-sectional top view of the bi-directional overrunning clutch assembly shown in FIG. 9 illustrating the first engagement mechanism in its engaged position and the second engagement mechanism in its disengaged position.
Figure 11:
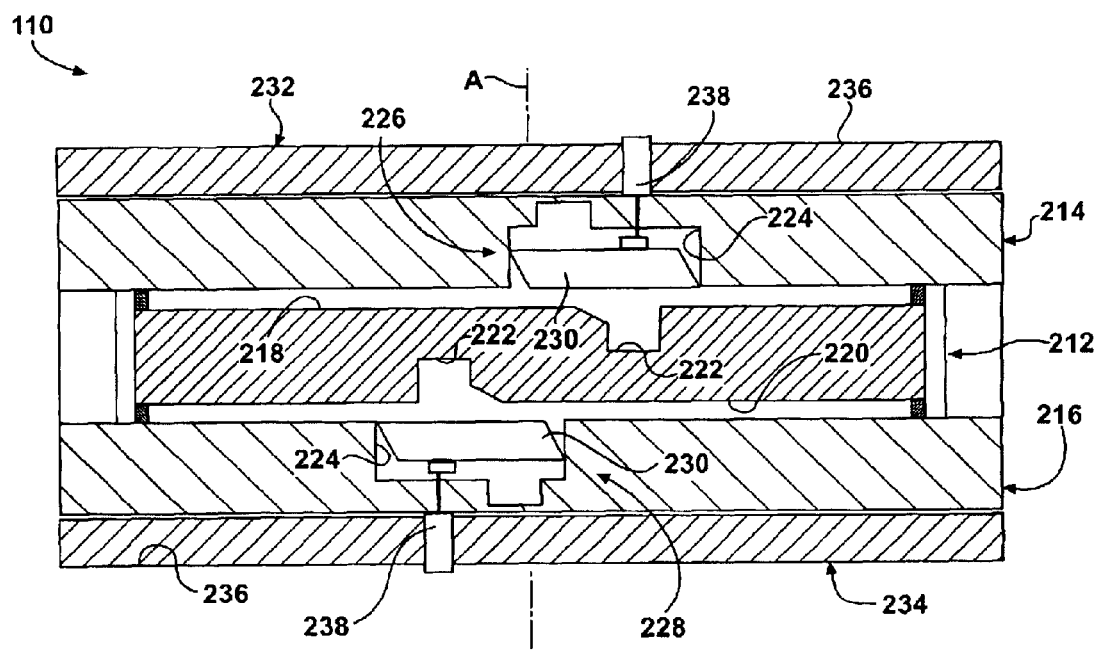
FIG. 11 is a cross-sectional top view of the bi-directional overrunning clutch assembly shown in FIG. 9 illustrating the first and second engagement mechanisms in their disengaged position.

Referring now to FIGS. 9–11 where like numerals increased by 200 are used to designate like structure with respect to the clutch assembly 10 illustrated in FIGS. 1–5, an alternate embodiment of the bi-directional overrunning clutch assembly of the present invention is generally indicated at 210. In this embodiment, the drive member 212, driven members 214, 216, and the first and second engagement mechanisms 226, 228 include substantially the same structure as that described with respect to the embodiment illustrated in FIGS. 1–5. Furthermore, the bi-directional overrunning clutch assembly 210 differs from the embodiments illustrated in FIGS. 1–5 only in connection with the structure of the pair of actuators 232, 234. Accordingly, the description that follows will focus primarily on these structural differences. Those having ordinary skill in the art will appreciate that, to the extent that any specific structure of the clutch assembly illustrated in FIGS. 9–11 is not specifically discussed below, its structure and function is the same for that described with respect to the clutch assembly 10 illustrated in FIGS. 1–5.

The overrunning clutch assembly 210 includes a pair of actuators 232, 234 having a plurality of solenoids 238 that are operatively connected to an associated one of the plurality of pawls 230. Each of the plurality of solenoids 238 are operable to selectively move the associated pawl 230 in an axial direction between its engaged and disengaged positions. More specifically, each solenoid 238 is operatively connected to an associated pawl 230 and acts to move the pawl to its disengaged position as well as back to its engaged position. No biasing mechanism is required to facilitate this actuation.

Figure 3:
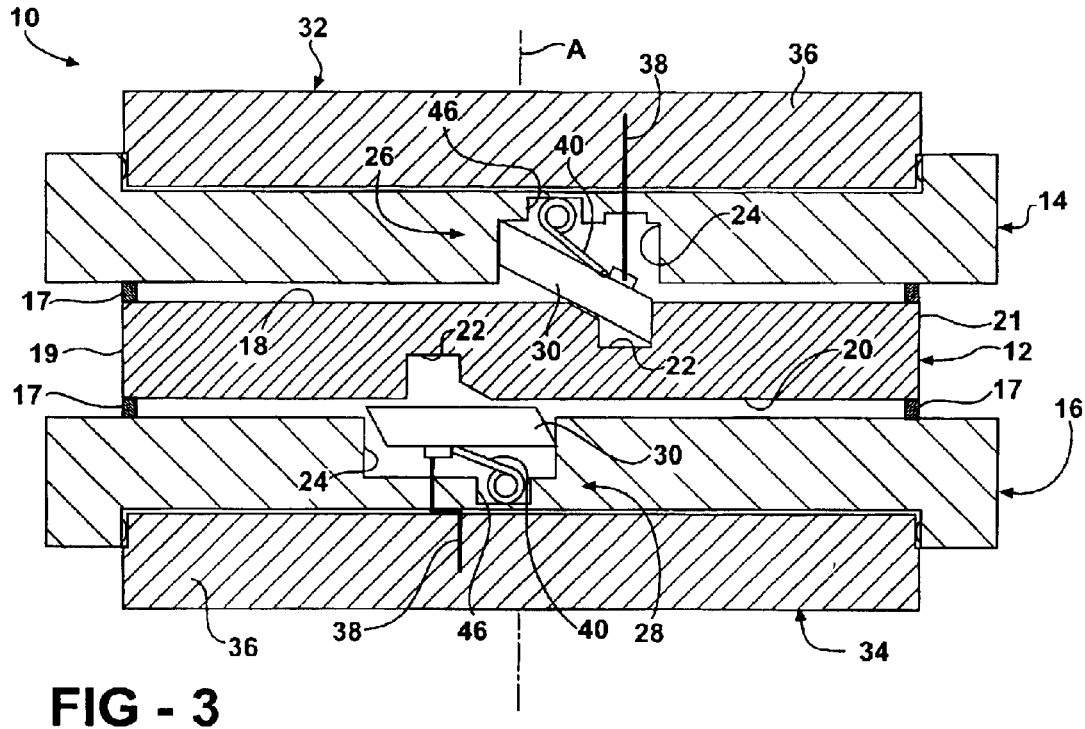
FIG. 3 is a cross-sectional top view of the bi-directional overrunning clutch assembly shown in FIG. 1 illustrating the first engagement mechanism in its engaged position and the second engagement mechanism in its disengaged position.
Figure 4:
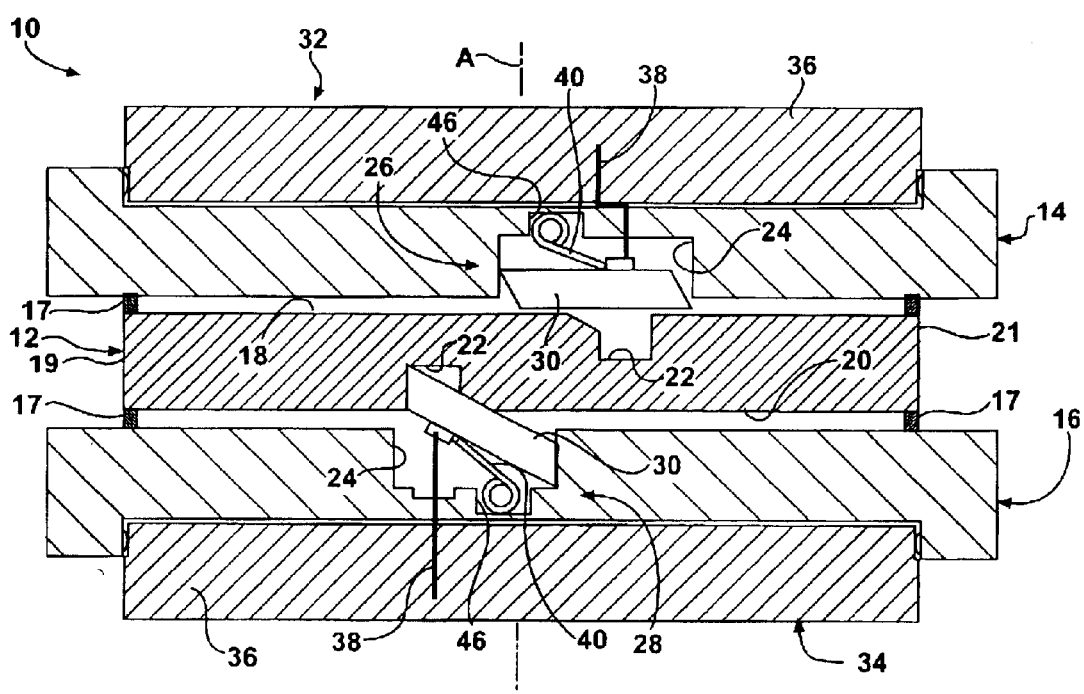
FIG. 4 is a cross-sectional top view of the bi-directional overrunning clutch assembly shown in FIG. 1 illustrating the first engagement mechanisms in its disengaged position and the second engagement mechanism in its engaged position.

The actuators 32, 34, 132, 134, 232, 234 control the actuation of each set of pawls 30, 130, 230 so that they are properly positioned in either their engaged or disengaged positions. Thus, each actuator is operable to (1) disengage its associated engagement mechanisms 26, 28, 126, 128, and 236, 238 to provide freewheeling motion between the drive member and the driven members in both rotational directions (as shown in FIG. 5); (2) to actuate one of the engagement mechanisms so that torque is translated in one rotational direction but to allow freewheeling in the opposite rotational direction (as illustrated in FIG. 3); (3) to actuate the opposing engagement mechanism as shown in FIG. 4 so that torque is translated in a direction opposite to that in mode (2) above but allow freewheeling in the rotational direction opposite to that in which torque is translated in this mode; and (4) to actuate both sets of engagement mechanisms so that the drive and driven members are locked relative to each other and torque is translated in both rotational directions (FIG. 1).

From the foregoing description, those having ordinary skill in the art will appreciate that the bi-directional overrunning clutch assembly 10, 110, 210 having four operational modes may be employed in any number of applications to provide one or more of the four operational modes described above. For example, the clutch assembly 10, 110, 210 may be employed to eliminate a multi-disk friction clutch as well as other components that are commonly used in transmissions, transfer cases, and differentials. In this way, the clutch assembly 10, 110, 210 may result in a reduction of parasitic energy losses that are associated with the use of multi-plate friction disk clutches. When used in this way, the clutch assembly 10, 110, 210 thereby results in reduced weight and a concomitant reduction in cost in the associated driveline components.

The present invention provides a bi-directional clutch that can be selectively actuated and controlled in a manner to provide driving comfort and offer efficient operational modes for various driving conditions. Furthermore, the bi-directional overrunning clutch assembly of the present invention is controllable such that it can provide both torque translation a freewheeling operation in either rotational direction. In addition, the bi-directional overrunning clutch assembly of the present invention can be effectively shifted between various operational modes without jamming of the engagement mechanisms or other failures occurring at the interface between the drive member and the two driven members associated with the drive member. Finally, the bi-directional overrunning clutch assembly of the present invention is mechanically simple, cost effective to manufacture, and overcomes the deficiencies in the related art in an efficient manner.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

I claim:

1. A bi-directional overrunning clutch assembly (10, 110, 210) comprising:

a drive member (12, 112, 212) rotatable about an axis (A) and a pair of driven members (14, 16; 114, 116; 214, 216) rotatable about said axis (A) and disposed on either side of said drive member (12, 112, 212) such that each one of said pair of driven members is in side-by-side confronting relationship with said drive member (12, 112, 212), said drive member (12, 112, 212) including a pair of generally planer surfaces (18, 20; 118, 120; 218, 220) disposed on opposite sides of said drive member with each of said planer surfaces including a plurality of recesses (22, 122, 222) formed therein and spaced relative to one another about the axis of rotation (A) of said drive member, each of said pair of driven members (14, 16; 114, 116; 214, 216) including a plurality of pockets (24, 124, 224) formed therein on said surface confronting the associated surface on said drive member;

first and second engagement mechanisms wherein said first engagement mechanism (26, 126, 226) includes a plurality of pawls (30, 130, 230) associated with said pockets (24, 124, 224) formed on each of said driven members, said plurality of pawls (30, 130, 230) supported between the confronting surfaces of said drive member (12, 112, 212) and one of said driven members (14, 114, 214), and said second engagement mechanism (28, 128, 228) includes a plurality of pawls (30, 130, 230) associated with said rockets (24, 124, 224) formed on each of said driven members, said plurality of pawls (30, 130, 230) supported between the confronting surfaces of said drive member (12, 112, 212) and the other of said driven members (16, 116, 216), and wherein said pawls (30, 130, 230) of said first engagement mechanism (26, 126, 226) are operable to move in an axial direction between a disengaged position allowing relative rotation between said drive member (12, 112, 212) and the driven member (14, 114, 214) associated with said first engagement mechanism (26, 126, 226) and an engaged position in torque translating disposition with respect to an associated recess defined on the confronting surface of said drive member (12, 112, 212) such that said first engagement mechanism (26, 126, 226) acts to translate torque between said drive member (12, 112, 212) and the associated driven member (14, 114, 214) in one rotational direction and said pawls (30, 130, 230) of said second engagement mechanism (28, 128, 228) are operable to move in an axial direction between a disengaged position allowing relative rotation between said drive member (12, 112, 212) and the driven member (16, 116, 216) associated with said second engagement mechanism (28, 128, 228) and an engaged position in torque translating disposition with respect to an associated recess defined on the confronting surface of said drive member (12, 112, 212) such that said second engagement mechanism (28, 128, 228) acts to translate torque between said drive member (12, 112, 212) and the associated driven member (16, 116, 216) in the opposite rotational direction translated with respect to the first engagement mechanism (26, 126, 226);

a pair of actuators (32, 34; 132, 134; 232, 234) associated with said first and second engagement mechanisms (26, 28; 126, 128; 226, 228), each actuator operable to move said associated engagement mechanism in an axial direction between said disengaged and said engaged positions.

2. A bi-directional overrunning clutch assembly (10) as set forth in claim 1 wherein each of said pair of actuators (32, 34) includes a plate (36) and a plurality of wires (38) associated with each one of said plurality of pawls (30) and interconnected between said plate (36) and each one of said pawls (30), said plate (36) being selectively rotatable to move said pawls (130) through said wire connections (38) between said engaged position and said disengaged position.

3. A bi-directional overrunning clutch assembly (10) as set forth in claim 1 wherein each of said pair of actuators (32, 34) includes a plurality of biasing members (40) associated with each one of said plurality of pawls (30), said biasing members (40) acting to bias said pawls (30) in an axial direction toward its associated recess (22) defined on the confronting surface (18, 20) of said drive member (12).

4. A bi-directional overrunning clutch assembly (110) as set forth in claim 1 wherein each of said pair of actuators (132, 134) includes a plate (136) and a plurality of spring-loaded pins (138) associated with each one of said plurality of pawls (130) and interconnected between said plate (136) and each one of said pawls (130), said plate (136) being selectively moveable in an axial direction to move said pawls (130) through said spring-loaded pins (138) between said engaged position and said disengaged position.

5. A bi-directional overrunning clutch assembly (110) as set forth in claim 4 further including at least one chamber (142) defined between said plate (136) of each actuator (132, 134) and its associated driven member (112), each chamber (142) in fluid communication with a source of hydraulic pressure to selectively move said plate (136) in a direction parallel to the rotational axis (A) of said clutch assembly (110) and away from said driven member (114, 116) to selectively move said plurality of spring-loaded pins (138) thereby moving said associated pawls (130) to their disengaged position.

6. A bi-directional overrunning clutch assembly (110) as set forth in claim 5 further including a biasing member (140) that produces a biasing force in a direction opposite to the force of the hydraulic pressure acting on said plate (136).

7. A bi-directional overrunning clutch assembly (210) as set forth in claim 1 wherein each of said pair of actuators (232, 234) includes a plurality of solenoids (238) operatively connected to an associated one of said plurality of pawls (230), each of said plurality of solenoids (238) operable to selectively move an associated pawl (230) in an axial direction between said engaged and disengaged positions.

\* \* \* \* \*